United States Patent [19]

Trouw

[11] Patent Number: 4,598,099

[45] Date of Patent: Jul. 1, 1986

[54] PROCESS FOR THE PRODUCTION OF POLYBENZIMIDAZOLE FOAMS

[75] Inventor: Norman S. Trouw, Gillette, N.J.

[73] Assignee: Celanese Corporation, New York, N.Y.

[21] Appl. No.: 791,049

[22] Filed: Oct. 24, 1985

[51] Int. Cl.$^4$ .............................................. C08J 9/02
[52] U.S. Cl. .................................... 521/77; 264/54; 264/331.16; 264/DIG. 5; 521/89; 521/92; 521/184; 521/185
[58] Field of Search ................... 521/184, 185, 89, 77, 521/92; 264/54, DIG. 5, 331.16

[56] References Cited

U.S. PATENT DOCUMENTS 4,092,274 5/1978 Fletcher .............................. 521/117
4,448,687 5/1984 Wang ..................................... 521/64

*Primary Examiner*—Morton Foelak
*Attorney, Agent, or Firm*—Lynch, Sherman & Cox

[57] ABSTRACT

The present invention is a process for the preparation of novel polybenzimidazole foams. The foams exhibit a closed cellular structure and are prepared by forming a polybenzimidazole solution, adding sulfuric acid to the polybenzimidazole solution, removing the solvent, and heat treating the polybenzimidazole at a temperature of about 350° to 600° C.

40 Claims, No Drawings

PROCESS FOR THE PRODUCTION OF POLYBENZIMIDAZOLE FOAMS

BACKGROUND OF INVENTION

1. Field of Invention

This invention relates to the preparation of foams. More particularly, this invention relates to the production of polybenzimidazole foams.

2. Prior Art

Many polymeric materials have been used in forming foam in the prior art and there are virtually as many methods of foaming prior art polymers as there are polymers. One example of a prior art polymer which readily can be foamed is polystyrene. However, a major problem with prior art polymeric foams is their lack of heat resistance. While these foams exhibit good insulation properties and provide excellent media for packing of delicate articles, when these foams are subject to even moderately elevated temperatures, they will collapse and lose their insulation or packaging properties.

Accordingly, it is an object of this invention to produce foams which exhibit good insulation and packaging properties.

It is another object of this invention to produce polybenzimidazole based foams.

It is another object of the invention to produce foams which maintain their foamed structure even when subject to elevated temperatures.

These and other objects are obtained by preparing polybenzimidazole foams according to the process of the instant invention.

SUMMARY OF INVENTION

The instant invention involves the discovery of a process to prepare polybenzimidazole foams which exhibit closed cellular structures. In this process, a dilute polybenzimidazole/dimethylacetamide dope is acidified with sulfuric acid to a pH of 1.0 to 5.0 and preferably about 1.0 to 3.8. The dope is cast into a film, formed into a fiber, or poured into a mold and the solvent is then removed by heat and vacuum application. The resultant polybenzimidazole film, fiber or three dimensional article is subjected to a heat treatment of about 400° to about 500° to produce a polybenzimidazole foam having a closed cellular structure. The instant invention is particularly useful for the preparation of insulating materials and three dimensional articles, such as containers for liquids.

DETAILED DESCRIPTION OF INVENTION

A. The Starting Material

The polybenzimidazoles useful in the present invention are linear polybenzimidazoles. Polybenzimidazoles are a known class of heterocyclic polymers. Typical polymers of this class and their preparation are more fully described in U.S. Pat. No. 2,895,948, U.S. Pat. No. Re. 26,065, and in the Journal of Polymer Science, Vol. 50, pages 511-539 (1961) which are incorporated by reference herein. The polybenzimidazoles consist essentially of recurring units of the following Formulas I and II. Formula I is:

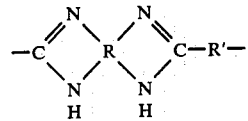

wherein R is a tetravalent aromatic nucleus, preferably symmetrically substituted, with the nitrogen atoms forming the benzimidazole rings being paired upon adjacent carbon atoms, i.e., ortho carbon atoms, of the aromatic nucleus, and R' is a member of the class consisting of (1) an aromatic ring, (2) an alkylene group (preferably those having 4 to 8 carbon atoms), and (3) a heterocyclic ring from the class consisting of (a) pyridine, (b) pyrazine, (c) furan, (d) quinoline, (e) thiophene, and (f) pyran.

Formula II is:

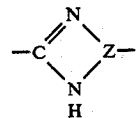

wherein Z is an aromatic nucleus having the nitrogen atoms forming the benzimidazole ring paired upon adjacent carbon atoms of the aromatic nucleus.

Preferably, aromatic polybenzimidazoles are selected from polymers consisting essentially of the recurring units of Formula I wherein R' is an aromatic ring or a heterocyclic ring and Formula II.

As set forth in U.S. Pat. No. Re. 26,065, the aromatic polybenzimidazoles having the recurring units of Formula II may be prepared by self-condensing a trifunctional aromatic compound containing only a single set of ortho disposed diamino substituents and an aromatic, preferably phenyl, carboxylate ester substituent. Exemplary of polymers of this type is poly-2,5(6)-benzimidazole prepared by the autocondensation of phenyl-3,4-diaminobenzoate.

As set forth in the above-mentioned patent, the aromatic polybenzimidazoles having the recurring units of Formula I may be prepared by condensing an aromatic tetraamine compound containing a pair of orthodiamino substituents on the aromatic nucleus with a dicarboxylic compound selected from the class consisting of (a) the diphenyl ester of an aromatic dicarboxylic acid, (b) the diphenyl ester of a heteroyclic dicarboxylic acid wherein the carboxyl groups are substituents upon a carbon in a ring compound selected from the class consisting of pyridine, pyrazine, furan, quinoline, thiophene and pyran and (c) an anhydride of an aromatic dicarboxylic acid.

Examples of polybenzimidazoles which have the recurring structure of Formula I are as follows:
poly-2,2'(m-phenylene)-5,5'-bibenzimidazole;
poly-2,2'-(pyridylene-3",5"))-5,5'-bibenzimidazole;
poly-2,2'-(furylene-2",5")-5,5'-bibenzimidazole;
poly-2,2'-(naphthalene-1",6"))-5,5'-bibenzimidazole;
poly-2,2'-(biphenylene-4",4")-5,5'-bibenzimidazole;
poly-2,2'-amylene-5,5'-bibenzimidazole;
poly-2,2'-octamethylene-5,5'-bibenzimidazole;
poly-2,6-(m-phenylene)-diimidazobenzene;
poly-2,2'-cyclohexeneyl-5,5'-bibenzimidazole;
poly-2,2'(m-phenylene)-5,5'-di(benzimidazole) ether;
poly-2,2'(m-phenylene)-5,5'-di(benzimidazole) sulfide;
poly-2,2'(m-phenylene)-5,5'-di(benzimidazole) sulfone;

poly-2,2'(m-phenylene-5,5"-di(benzimidazole) methane;
poly-2',2"(m-phenylene-5,5"-di(benzimidazole) propane-2,2; and
poly-2, 2'-(m-phenylene)-5', 5"-di(benzimidazole) ethylene-1,2 where the double bonds of the ethylene groups are intact in the final polymer.

The preferred polybenzimidazole for use in the present process is one prepared from poly-2,2'-(m-phenylene)-5,5'-bibenzimidazole, the recurring unit of which is:

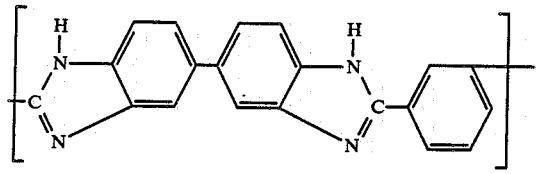

Any polymerization process known to those skilled in the art may be employed to prepare the polybenzimidazole which may then be foamed according to the process of this invention. Representative techniques for preparing the polybenzimidazole are disclosed in U.S. Pat. Nos. 3,509,108, 3,549,603, 3,551,389, 4,312,976, 4,452,971, 4,452,972, 4,483,977 and 4,485,232 which are herein incorporated by reference.

With respect to aromatic polybenzimidazoles, preferably equimolar quantities of the monomeric tetraamine and dicarboxyl compound are introduced into a first stage melt polymerization reaction zone and heated therein at a temperature above about 200° C., preferably at least 250° C., and more preferably from about 270° C., to 300° C. The reaction is conducted in a substantially oxygen-free atmosphere, i.e., below about 20 ppm oxygen and preferably below about 8 ppm oxygen, until a prepolymer is formed having an inherent viscosity, expressed as deciliters per gram, of at least 0.1 and preferably from about 0.13 to 0.3. The inherent viscosity (I.V.) as used herein is determined from a solution of 0.4 grams of the polymer in 100 ml. of 97 percent $H_2SO_4$ at 25° C.

After the conclusion of the first stage reaction, which normally takes at least 0.5 hour and preferably 1 to 3 hours, the foamed prepolymer is cooled and then powdered or pulverized in any convenient manner. The resulting prepolymer powder is then introduced into a second stage polymerization reaction zone wherein it is heated under substantially oxygen-free conditions, as described above, to yield a polybenzimidazole polymer product, desirably having an I.V., as measured above, of at least 0.4, e.g., 0.8 to 1.1 or more.

The temperature employed in the second stage is at least 250° C., preferably at least 325° C., and more preferably from about 350° to 425° C. The second stage reaction generally takes at least 0.5 hour, and preferably from about 1 to 4 hours or more. It is, of course, also possible to prepare the instant polymers via a one-step reaction. However, the previously-described two-step process is preferred.

B. The Polymer Solution

The solvents utilized to form the polybenzimidazole polymer solution that is acidified prior to foaming the polybenzimidazole include those solvents which are commonly-recognized as being capable of dissolving the particular polybenzimidazole polymer. For instance, the solvents may be selected from those commonly utilized in the formation of polybenzimidazole dry spinning solutions. Illustrative examples of suitable solvents include N,N-dimethyl acetamide, N,N-dimethyl formamide, dimethyl sulfoxide, and N-methyl-2-pyrrolidone. The particularly preferred solvent is N,N-dimethyl acetamide. Additional representative solvents include formic acid, acetic acid, and sulfuric acid.

The polymer solutions may be prepared, for example, by dissolving sufficient polybenzimidazole in the solvent to yield a final solution containing from about 5 to 30 percent by weight of polymer based on the total weight of the solution, and preferably from about 10 to 20 percent by weight.

The quantity of polybenzimidazole dissolved in the solvent should be such that the resulting solution has a viscosity of about 50 to 4,000 poise at 30° C., and preferably about 200 to 3000 poise.

One suitable means for dissolving the polymer in the solvent is by mixing the materials at a temperature above the normal boiling point of the solvent, for example, about 25° to 120° C. above such boiling point, and at a pressure of 2 to 15 atmospheres for a period of 1 to 5 hours. The resulting solutions are preferably filtered to remove any undissolved polymer. A minor amount of lithium chloride optionally may be provided in the solution in accordance with the teachings of commonly-assigned U.S. Pat. No. 3,502,606. The lithium chloride serves the function of preventing the polybenzimidazole polymer from phasing out of the solution upon standing for extended periods of time. Preferably about 0.1 to about 5 percent by weight of lithium chloride based on the total solution weight is added, and most preferably about 1 to 4 percent.

After the polymer solution or dope is prepared, it is acidified with sulfuric acid. Enough sulfuric acid is added so that the dope exhibits a pH of less than about 5, preferably less than about 3.8 and most preferably about 3.0–3.8. Acidification may be carried out by adding either concentrated or dilute sulfuric acid to the dope. In the most preferred instance, from about 2 to about 5 times the actual amount of sulfuric acid required to achieve the desired pH is added to the dope.

The acidified polybenzimidazole dope may be cast into a film. Any of the casting surfaces and casting techniques known in the art may be utilized to form the film. It is preferred, however, that the casting surface be a glass plate. Most preferably a glass plate with an edge formed from stainless steel, for example, is employed. The edges act to contain the acidified polymer dope during film formation. The thickness of the film can vary. However, it is preferred that the film thickness be in the range of about 0.25 to 10 mils and preferably about 0.5 to about 5 mils.

After the film is cast, the solvent is removed. Any of the techniques known in the art to remove solvents from films may be utilized. However, the preferred method for removing the solvent is to place the film in a vacuum oven. While the film is in the oven, the temperature is increased and the pressure is reduced gradually or in steps to insure that no bubbles are formed in the film. The initial oven temperature should be in the range of about 30° to 90° C., with the range of about 50° to 70° C. being preferred. The film is held at the initial temperature for about 10 to 20 minutes. After this period the temperature is increased up to about 200° C. preferably to about 175° C. The initial pressure in the vacuum oven should be in the range of about 1 to 5.0 in Hg. As the solvent is removed, the pressure is increased to about 25 to about 35 in. Hg. A typical heating/vacuum sequence is as follows. The film is initially held for 15 minutes at 60° C. and 2.5 in. Hg., Then for 15 minutes at 60° C. and 5.0 in. Hg., then for 15 minutes at 60° C. and 7.5 in. Hg., and then 15 minutes at 60° C. and 10.0 in. Hg. Subsequently, the temperature is elevated to 175° C., the pressure increased to 25 in. Hg., and the film is held for 15 minutes at 175° C. and 25 in. of Hg.

The temperatures specified above may be adjusted depending upon the particular solvent which is employed. The final temperature is just above the boiling point of which ever solvent is employed. Following vacuum/heating, heat is removed and the oven purged with a gas such as nitrogen while the pressure is allowed to return to ambient conditions. By the time the heat is removed, the film will have been in the oven for at least 30–45 minutes, preferably at least one hour. When the oven temperature reaches about 80° C., the film is removed from the oven. The resulting film should have a film thickness preferably about 3 to about 10 mils.

After removal from the oven, the polybenzimidazole film can be foamed. Foaming takes place when the film is heated to about 350° C. to 600° C. with about 400° C. to 500° C. being preferred. The film is held at the foaming temperature for about 15 to 90 seconds, preferably about 20 to 40 seconds. Foaming may be carried out in a mold or in unrestrained conditions. In either case, the foamed polybenzimidazole may be used as is or it may be divided or cut into convenient shapes and sizes. In the preferred instance, when the film is not heated in a mold, it is maintained under slight tension during the foaming process.

After the film has been foamed, the lithium chloride that was present in the dope may be extracted. This can be achieved in a variety of ways such as by washing the foamed article several times in water. It is preferred however, to immerse the foamed article in boiling water for about 10 to 100 minutes, preferably 20 to 40 minutes. Lithium chloride removal is particularly necessary if the foamed film of the instant invention is to be used in electrical applications where electrical conductivity of the film is undesirable.

In addition to films, fibers may be prepared from the polymeric solution and foamed as described hereinafter. After the solution is acidified with the sulfuric acid, it may be used to form fibers by techniques well known in the art. Any of the processes disclosed in U.S. Pat. Nos. 3,502,756, 3,526,693, 3,541,199, 3,584,104, 3,619,453, or 3,723,592 may be used to prepare polybenzimidazole fibers. These patents are incorporated herein by reference.

After the fiber is formed, it is dried by removal of the solvent using conventional techniques. The fiber can be foamed as is or woven into a fabric or wound around an article and then foamed using procedures similar to those disclosed above.

Alternatively, the acidified polymeric solution may be poured into a mold. Part or all of the solvent is removed, such as by a heat and vacuum procedure as in the case of films. After removal of the solvent, the polybenzimidazole is foamed by exposing it to a temperature in the range of about 350° to 600° C. preferably about 400° to 500° C. The time of exposure to the heat will generally be in the range of 15 to 90 seconds.

The polybenzimidazole foams prepared according to the process of the instant invention have a closed cellular structure. Consequently, they may be employed in a variety of end uses. For example, because of their closed cellular structure, the foams find particular use as fire-resistant insulation and/or packaging materials. The foamed film can also be used as low resistive membranes for fuel cells, as molding materials, or in an intumescent paint.

The invention is illustrated by the following example.

EXAMPLE

A 10 percent solids polybenzimidazole/dimethylacetamide dope was prepared by adding 31.74 grams of poly-2,2'-(m-phenylene)-5,5' bibenzimidazole having an inherent viscosity of 0.80 to 285.66 grams of dimethylacetamide and 2.39 grams of lithium chloride. The polybenzimidazole was acidified by adding 13.8 ml. of 2.5 percent sulfuric acid to the dope. The pH of the acidified dope was 3.8. Upon a glass plate measuring 8"×8"×¼" and surrounded by a stainless steel frame, 7.5 ml. of the dope were cast. The glass plate was placed in a vacuum oven and held for 15 minutes at each of the following combinations of temperatures and pressures: 60° C./27.5 in. Hg, 60° C./25.0 in. Hg., 60° C./22.5 in. Hg., 60° C./20.0 in. Hg., and 175° C./1 in. Hg. The heat was then turned off and the oven was purged with nitrogen. The pressure was increased to ambient conditions at which time the nitrogen was released. When the temperature reached 80° C., the film was removed from the oven. The film was foamed by exposing the film to a temperature of 450° C. for 30 seconds. The lithium chloride present in the casting solution was removed by placing the foamed film in 800 mls. of boiling distilled water for 30 minutes.

Microscopic analysis of the polybenzimidazole foamed film disclosed a closed cellular structure useful as a high temperature insulating material.

What is claimed is:

1. A process for the preparation of a polybenzimidazole foam wherein the process comprises the following steps:
   (a) preparing a casting solution of a polybenzimidazole polymer in a solvent capable of dissolving the polymer;
   (b) acidifying the polybenzimidazole polymer solution using sulfuric acid;
   (c) forming a shaped article from the casting solution;
   (d) removing the solvent from the shaped article; and
   (e) heat treating the shaped article to form a foam.

2. The process of claim 1 wherein the polybenzimidazole polymer consists essentially of recurring units of the formula:

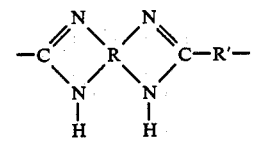

wherein R is a tetravalent aromatic nucleus, with the nitrogen atoms forming the benzimidazole rings paired upon adjacent carbon atoms of the aromatic nucleus, and R' is selected from the group consisting of (1) an aromatic ring, (2) an alkylene group having from four to eight carbon atoms, and (3) a heterocyclic ring selected from the group consisting of (a) pyridine, (b) pyrazine, (c) furan, (d) quinoline, (e) thiophene, and (f) pyran.

3. The process of claim 1 wherein the polybenzimidazole polymer consists essentially of the recurring units of the formula:

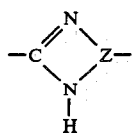

wherein Z is an aromatic nucleus having the nitrogen atoms forming the benzimidazole ring paired upon adjacent carbon atoms of the aromatic nucleus.

4. The process of claim 1 wherein the polybenzimidazole polymer is poly-2,2'-(m-phenylene)-5,5'-bibenzimidazole.

5. The process according to claim 1 wherein the casting solution of the polybenzimidazole prior to casting includes approximately 0.1 to 5 percent lithium chloride, based upon the total weight of the casting solution.

6. The process according to claim 1 wherein the solvent for the casting solution is dimethylacetamide.

7. The process as in claim 1 or 5 wherein the casting solution is comprised of approximately 5 to 30 percent by weight of the polybenzimidazole polymer.

8. The process as in claim 1 or 5 wherein the casting solution is comprised of approximately 10 to 20 percent by weight of the polybenzimidazole polymer.

9. The process according to claim 1 wherein the pH of the polymeric solution after the addition of the sulfuric acid is less than about 5.0.

10. The process according to claim 9 wherein the pH is less than about 3.8.

11. The process according to claim 9 wherein the pH is about 3.0 to 3.8.

12. The process according to claim 1 wherein the shaped article is a film and the solvent in step (d) is removed by heating the film in a vacuum oven.

13. The process according to claim 12 wherein the pressure in the vacuum oven is varied in the range of about 2.0 to 35 ins. Hg and the temperature is varied in the range of 30° to 200° C.

14. The process according to claim 13 wherein the pressure is varied between about 2.5 and 25.0 inches of Hg, and the temperature is varied between about 60° and 175° C.

15. The process according to claim 1 wherein the shaped article is heat treated in step (e) in the temperature range of 350° to 600° C.

16. The process according to claim 1 wherein the temperature is in the range of about 400° to 500° C.

17. The process according to claim 5 wherein residual lithium chloride is removed by boiling the shaped article in water.

18. A process for the preparation of a polybenzimidazole foam wherein the process comprises the following steps:
(a) preparing a casting solution of a polybenzimidazole polymer and lithium chloride in a solvent capable of dissolving the polymer wherein the polymer is present in the range of about 5 to 30 percent by weight and the lithium chloride is present in the range of about 0.1 to 5.0 percent by weight based upon the total weight of the solution;
(b) adding sufficient sulfuric acid to the casting solution to reduce the pH to less than about 5.0;
(c) forming a shaped article from the casting solution;
(d) removing the solvent from the article in a vacuum oven;
(e) heat treating the article in the temperature range of about 350° to 600° C. for a period of time in the range of about 15 to 90 seconds to form a foam; and
(f) removing the residual lithium chloride.

19. A process for the preparation of a polybenzimidazole foam wherein the process comprises the following steps:
(a) preparing a casting solution of a polybenzimidazole polymer and lithium chloride in a solvent capable of dissolving the polymer wherein the polymer is present in the range of about 5 to 30 percent by weight and the lithium chloride is present in the range of about 0.1 to 5.0 percent by weight based upon the total weight of the solution;
(b) adding sufficient sulfuric acid to the casting solution to reduce the pH to less than about 5.0;
(c) casting a film of said casting solution upon a support;
(d) removing the solvent from the film by placing the film in a vacuum oven and exposing the film to temperatures in the range of about 40° to 200° C. and to pressures in the range of about 2.0 to 35.0 inches of Hg;
(e) heat treating the film in the temperature range of about 350° to 600° C. for a period of time in the range of about 15 to 90 seconds to form a foamed film; and
(f) removing the residual lithium chloride.

20. The process as in claim 18 or 19 wherein the polybenzimidazole polymer consists essentially of recurring units of the formula:

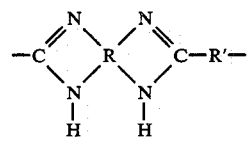

wherein R is a tetravalent aromatic nucleus, with the nitrogen atoms forming the benzimidazole rings paired upon adjacent carbon atoms of said aromatic nucleus, and R' is selected from the group consisting of (1) an aromatic ring, (2) an alkylene group having from four to eight carbon atoms, and (3) a heterocyclic ring selected from the group consisting of (a) pyridine, (b) pyrazine, (c) furan, (d) quinoline, (e) thiophene, and (f) pyran.

21. The process as in claim 18 or 19 wherein the polybenzimidazole polymer consists essentially of the recurring units of the formula:

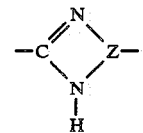

wherein Z is an aromatic nucleus having the nitrogen atoms forming the benzimidazole ring paired upon adjacent carbon atoms of the aromatic nucleus.

22. The process as in claim 18 or 19 wherein the polybenzimidazole polymer is poly-2,2'-(m-phenylene)-5,5'-bibenzimidazole.

23. The process as in claim 18 or 19 wherein the casting solution of the polybenzimidazole prior to casting includes about 1 to about 4 percent lithium chloride, based upon the total weight of the casting solution.

24. The process as in claim 18 or 19 wherein the solvent for the casting solution comprises dimethylacetamide.

25. The process as in claim 18 or 19 wherein the casting solution is comprised of approximately 10 to about 20 percent by weight of the polybenzimidazole polymer.

26. The process as in claim 18 or 19 wherein the pH of the solution after the addition of sulfuric acid is less than about 3.8.

27. The process as in claim 18 or 19 wherein the pH of the solution after the addition of sulfuric acid is about 3.0 to 3.8.

28. The process as in claim 18 or 19 wherein the pressure in the vacuum oven is varied between about 2.5 and 25.0 ins Hg., and the temperature is varied between about 60° and 175° C.

29. The process as in claim 18 or 19 wherein the film or article in step (e) is heat treated at a temperature of about 400° to 500° C.

30. The process as in claim 18 or 19 wherein the residual lithium chloride is removed by boiling in water.

31. The shaped article prepared according to the process as in any one of claims 1–6 or 9–18.

32. The film prepared according to the process of claim 19.

33. The shaped article prepared according to the process of claim 7.

34. The shaped article prepared according to the process of claim 8.

35. The process as in any one of claims 1–6 or 9–18 wherein the shaped article is a film.

36. The process as in any one of claims 1–6 or 9–18 wherein the shaped article is a fiber.

37. The process as in any one of claims 1–6 or 9–18 wherein the shaped article is a molded article.

38. The film prepared according to the process of claim 35.

39. The fiber prepared according to the process of claim 36.

40. The molded article prepared according to the process of claim 37.

* * * * *